United States Patent [19]
Ward

[11] Patent Number: 4,961,075
[45] Date of Patent: Oct. 2, 1990

[54] TWO AND ONE-HALF DIMENSIONAL RADAR SYSTEM

[75] Inventor: Harold R. Ward, Bedford, Mass.

[73] Assignee: Raytheon Company, Lexington, Mass.

[21] Appl. No.: 405,789

[22] Filed: Sep. 11, 1989

[51] Int. Cl.$^5$ .............................................. G01S 3/46
[52] U.S. Cl. ..................................... 342/140; 342/148
[58] Field of Search ............... 342/147, 148, 139, 140, 342/123

[56] References Cited

U.S. PATENT DOCUMENTS

| | | |
|---|---|---|
| 3,106,708 | 10/1963 | Sletten . |
| 3,277,470 | 10/1966 | Page . |
| 4,224,618 | 9/1980 | Rich et al. ........................ 343/5 EM |
| 4,342,997 | 9/1982 | Evans ................................ 343/16 R |
| 4,353,073 | 10/1982 | Brunner et al. ..................... 343/779 |
| 4,649,390 | 3/1987 | Andrews et al. .................... 342/140 |

OTHER PUBLICATIONS

"Introduction to Radar Systems," Second Edition, Merrill I. Skolnik, 1980, McGraw-Hill Book Company, pp. 541–547.

*Primary Examiner*—Thomas H. Tarcza
*Assistant Examiner*—Mark Hellner
*Attorney, Agent, or Firm*—Walter F. Dawson; Richard M. Sharkansky

[57] ABSTRACT

A radar system for determining not only the azimuth and range of a target but also the target height over a predetermined range of elevation angles has separate receiving and signal processing channels coupled to a dual beam antenna for processing signals returned from a single target. The output of each signal processor is coupled to a height processor which divides the sum of the received signals into the difference of the two signals. The resulting ratio is used to access a look-up table to identify the elevation angle associated with the ratio from which the height of the target is calculated. The look-up table includes correction values to compensate for the antenna pattern nonlinearity.

13 Claims, 2 Drawing Sheets

TWO AND ONE-HALF DIMENSIONAL RADAR SYSTEM

BACKGROUND OF THE INVENTION

The present invention relates to a surveillance radar system and more particularly to a single radar system for not only determining azimuth and range of a target but also for finding the target height over limited range elevation angles A two dimensional (2D) radar measures range and one angle coordinate (usually azimuth) It provides coverage over a volume and space extending from the radar site to the maximum detection range and from the horizon elevation up to the maximum target altitude of interest (usually 40,000 feet in the case of aircraft targets). The radar scans 360 degrees in azimuth with the antenna providing a complete rotation every five to ten seconds; as the antenna beam scans past the target, a number of pulse returns are received. These pulse returns are processed to eliminate returns from clutter and to integrate the target returns to make a detection decision on each target resulting in determining the target's azimuth and range.

Three dimensional (3D) radars measure, not only azimuth and range but also elevation angle or height above sea level. They are typically complex, expensive, heavy in antenna weight and have low S/N ratios due to fewer target pulse repetition frequency (PRF) returns. When elevation angle information is required the additional radar hardware is necessary. For a further discussion of 3D radar systems refer to "Introduction to Radar Systems" by Merrill I. Skolnik, second edition, 1980, pp. 541-547 and to U.S. Pat. No. 4,649,390 of LaVern A. Andrews et al. However, in certain applications such as air traffic control systems only limited heights are involved and a radar system not having the complexity of a typical 3D radar is desirable.

In U.S. Pat. No. 4,342,997 to Gary E. Evans, a radar antenna system is disclosed that adds height capability to a 2D array radar. A first subarray and a second subarray of antenna elements form two beams in different directions to achieve illumination characteristics of both the phase angle difference and the amplitude difference with respect to a common target for deriving the elevation of the target. However, this technique does require phase angle measurements in addition to amplitude measurements and includes parabolic cylinder reflector/linear array type antenna systems used in applications where a sharp underside cutoff region of long maximum range coverage is desireable; such a beam characteristic is generally not used for a terminal air traffic control application.

SUMMARY OF THE INVENTION

In accordance with the present invention a two and one-half dimensional (2½ D) radar system is provided for determining not only azimuth and range but also the height of a target over a predetermined range of elevation angles sufficient for a particular radar system application with minimal increase in hardware over a two dimensional radar system. Such a radar system comprises means for transmitting a radar signal including a dual beam antenna having a high beam pattern and a low beam pattern, first means coupled to the transmitting means for converting a return signal of the target from the high beam pattern to an amplitude sample $M_a(i)$, second means coupled to the transmitting means for converting a return signal of the target from the low beam pattern to an amplitude sample $M_b(i)$, means coupled to the amplitude sample outputs $M_a(i)$ and $M_b(i)$ of the first converting means and the second converting means for processing the outputs to determine the height of the target. The height processing means comprises means coupled to the first and second converting means for calculating a normalized difference $C(i)$ between the amplitude sample $M_a(i)$ and the amplitude sample $M_b(i)$, means coupled to the calculating means for storing antenna pattern conversion data to compensate the normalized difference $C(i)$ for nonlinearity of the antenna pattern, and means coupled to the storing for calculating the height of the target in accordance with elevation angle data from the storing means. The radar signal is transmitted via the low beam pattern portion of the transmitting means. The first converting means comprises a first receiver means for producing vector data from the high beam return signal and a first processor means coupled to the first receiving means for determining the amplitude sample $M_a(i)$. The second converting means comprises a second receiver means for producing vector data from the low beam return signal and a second processor means coupled to the second receiver means for determining the amplitude sample $M_b(i)$.

In accordance with a further feature of the invention a method is provided for determining with a radar system the height of a target over a predetermined range of elevation angles comprising the steps of transmitting a radar signal with a dual beam antenna having a high beam pattern and a low beam pattern, converting a return signal of the target from the high beam pattern to an amplitude sample $M_a(i)$ by first means coupled to the transmitting means, converting a return signal of the target from the low beam pattern to an amplitude sample $M_b(i)$ by second means coupled to the transmitting means, calculating a normalized difference between the amplitude sample $M_a(i)$ and the amplitude sample $M_b(i)$, storing antenna pattern conversion data in memory means addressed by said normalized difference to compensate for nonlinearity of the antenna pattern, and calculating the height of said target by means coupled to an output of said storing means.

BRIEF DESCRIPTION OF THE DRAWINGS

Other and further features of the invention will become apparent in connection with the accompanying drawings wherein.

DESCRIPTION OF THE PREFERRED EMBODIMENT

Figure 2:
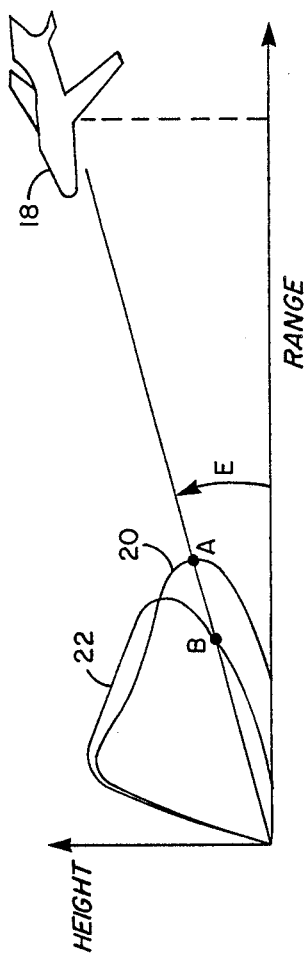
FIG. 2 is a diagram showing high and low beam patterns of a dual beam antenna along with a return signal from a target airplane.
Figure 1:
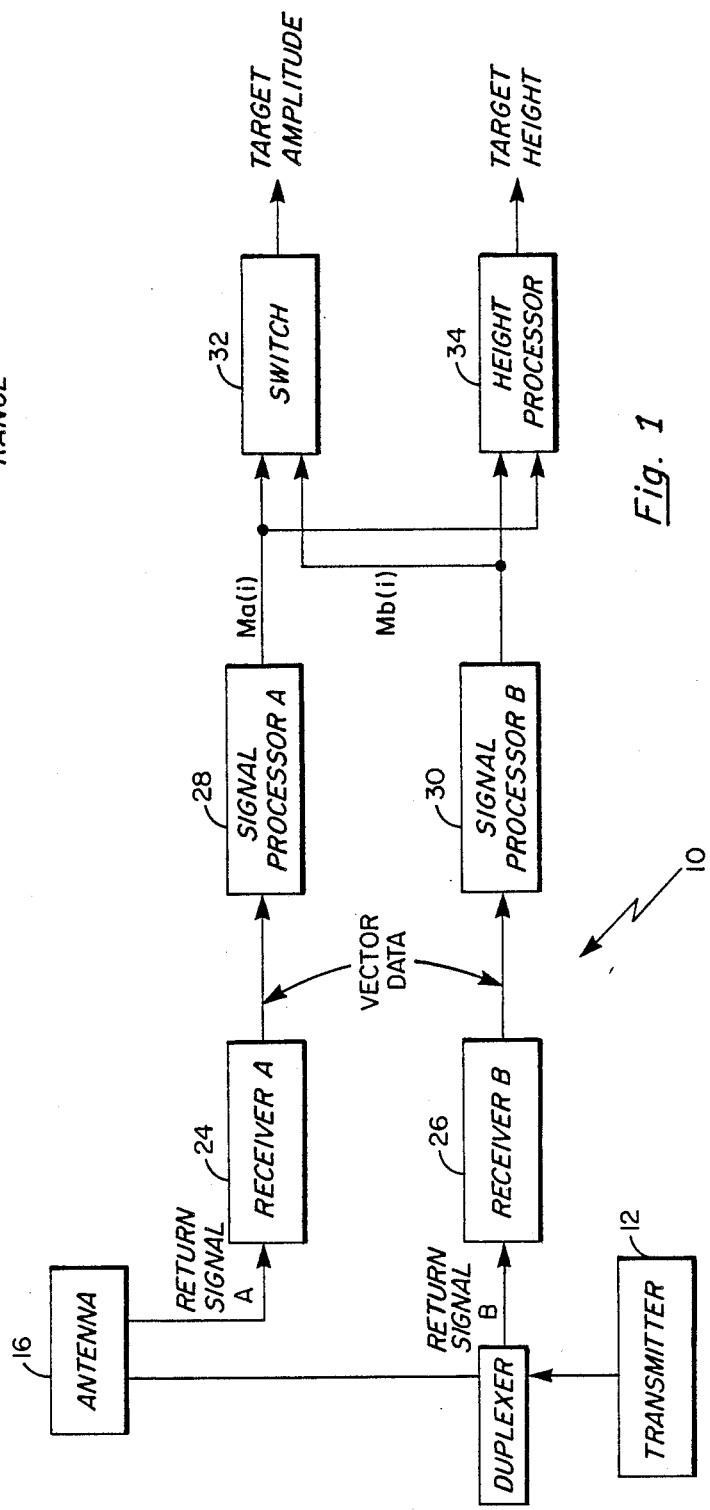
FIG. 1 is a functional block diagram of the invention comprising a 2½ D radar system.

Referring to FIG. 1 and FIG. 2 there is shown a functional block diagram of the invention comprising a radar system 10 for determining an azimuth and range of a target and the target height over predetermined limited range elevation angles. Such a radar system is referred to as a two and one-half dimensional (2½ D) radar because the target height is determined for a limited range of elevation angles. Transmitter 12 provides a radar signal via duplexer 14 to a dual beam antenna 16 for detecting a target such as an airplane 18 shown in FIG. 2. The antenna 16 has a curved reflector surface and a source feed. The curved reflector provides the desired shaping of the beams, and it is produced by displacing a portion of the reflector surface from the original parabolic shape. A low beam 20 of the dual beam antenna 16 is used for transmit and receive and a high beam 22 is used for receive only.

Return signals (A) from the high beam are coupled from the antenna 16 to a receiver A 24 and vector data output from receiver A 26 is coupled to a signal processor A 28. Similarly, return signals (B) from the low beam are coupled from the antenna 16 to a receiver B 26 via the duplexer 14, and vector data outputs from receiver B 26 are coupled to a signal processor B 30. The vector data output of receiver A 24 and receiver B 26 are obtained by quadrature detection analog-to-digital conversion of the in-phase (I) and quadrature phase (Q) signals which is commonly known to one skilled in the art. The analog-to-digital converters sample the received waveform at times corresponding to contiguous points in range. Since the radar scans the entire volume, radar returns from all ranges must be received and processed. Signal processor A 28 and signal processor B 30 accept the vector data first removing ground clutter using doppler filtering techniques (known to one skilled in the art) and then form the magnitude of the filtered output samples before combining all of the signal samples received from a single target. The outputs from signal processor A 28 and signal processor B 30 are amplitude samples $M_a(i)$ and $M_b(i)$ respectively which are coupled to a switch 32 and to a height processor 34. The relative amplitudes of $M_a(i)$ and $M_b(i)$ depend on the antenna beam patterns and target elevation as illustrated in FIG. 2. This index "i" denotes the particular signal sample and it is proportional to the time since the transmitted pulse (target range). The conventional radar output amplitude data, shown in FIG. 1 as Target Amplitude, is obtained from switch 32 by selecting either the high beam or low beam output depending on the clutter strength or range.

Figure 3:
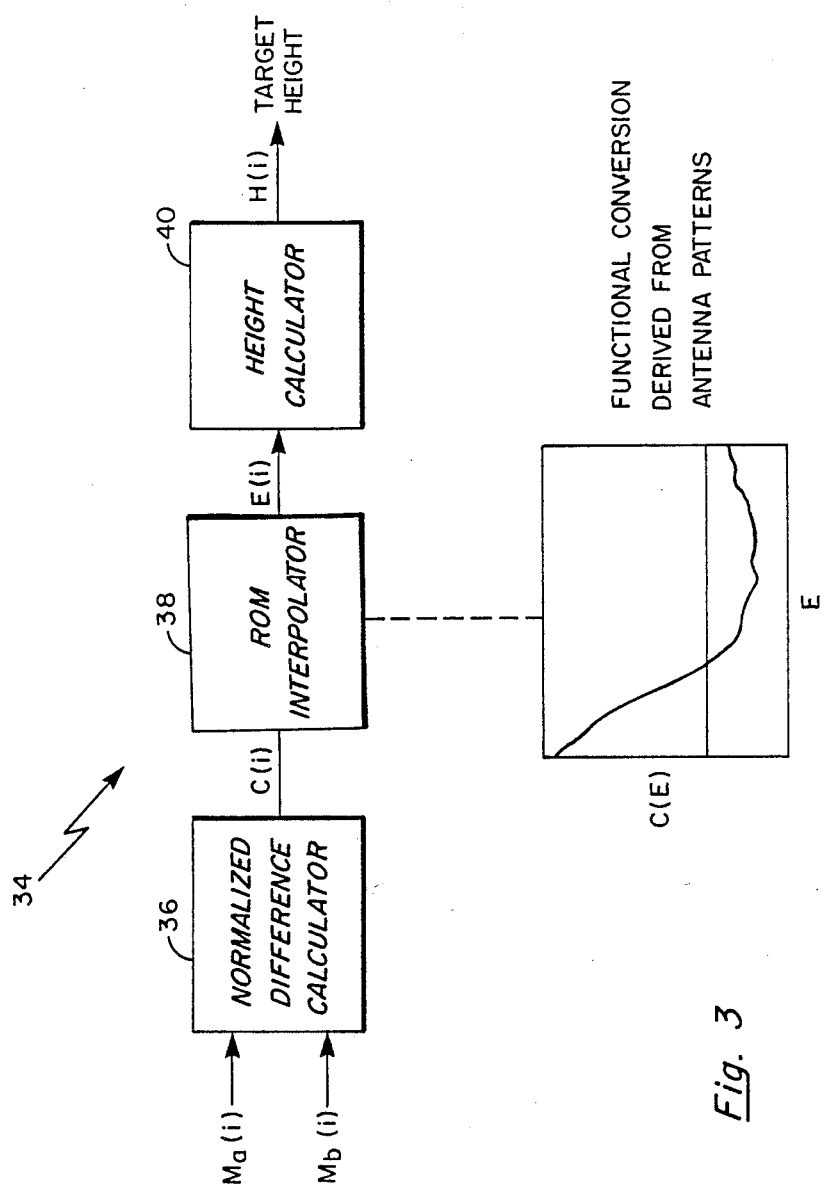
FIG. 3 is a functional block diagram of a height calculator of the 2½ D radar system.

Referring now to FIG. 3, target height is obtained from calulations performed by the height processor 34 which compares the high and low beam magnitudes in those range samples where targets have been detected. The amplitude samples $M_a(i)$ and $M_b(i)$ are coupled to a normalized difference calculator 36 which determines the normalized difference C(i), of the high and low beam magnitudes in order to make the height determination independent of signal strength or amplitude. C(i) is calculated according to equation 1.

$$C(i) = \frac{M_a(i) - M_b(i)}{M_a(i) + M_b(i)} \quad (Eq\ 1)$$

The output C(i) is coupled to a read-only-memory (ROM) interpolator 38 which has a look-up table that converts the determined C(i) to an elevation angle E(i).

The corresponding values of C and E contained in the look-up table of ROM 38 are derived from the pattern amplitude measurements for a particular radar antenna. The look-up table values correct the normalized difference C(i) resulting from the normalized difference calculator 36 by compensating for the nonlinearity of the antenna pattern. The antenna pattern measurements $P_a(E)$ and $P_b(E)$ are used to compute a value of C for each elevation angle E using Eq 2.

$$C(E) = \frac{P_a(E) - P_b(E)}{P_a(E) + P_b(E)} \quad (Eq.\ 2)$$

$$E = \frac{C - C(n)}{C(n + 1) - C(n)} E(n) \quad (Eq.\ 3)$$

The table of values for C and E is then interpolated to convert C to E using equation 3, where C(n) is the nearest value of C in the look-up table that is smaller than the input C, and E(n) is the value in the table which corresponds to C(n). FIG. 3 shows a plot of the typical data stored in Rom interpolator 38. The ROM interpolator 38 output provides an elevation angle for each target detection up to the elevation where the derivative of the stored function approaches zero. The output E(i) is then coupled to a height calculator 40.

The Target Height H is determined in the height calculator 40 from the elevation and range data by solving the equation H = (k)(i)sin E. Range is contained in "i", the target sample index, which represents the time between the transmit pulse and the received echo. The factor k is the scaling factor between the target sample index, i, and target range. The target height H(i) at the output of the height calculator 40 is now available for use by the radar system or operator as an additional source of target information.

The preferred embodiment as shown in FIGS. 1 and 3 provides accurate height measurements in the region where C varies rapidly with E. In a typical air traffic control radar this occurs for elevation angles from zero to six degrees. Height information below 6 degrees covers most of the targets of interest to a terminal air traffic controller. Most of the aircraft are either on a glide path (3 degree elevation) approaching landing or in holding patterns which are also generally below 6 degrees elevation. Airport departures typically climb at about 10 degrees elevation angles and are though a 2½ D radar may be limited to about 6 degrees elevation, it covers the targets of interest in a terminal control area for minimal costs over a 2D radar system.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. A radar system for determining azimuth, range and height of a target over a predetermined range of elevation angles comprising:
    means for transmitting a radar signal including a dual beam antenna having a high beam pattern and a low beam pattern;
    first means coupled to said transmitting means for converting a return signal of said target from said high beam pattern to an amplitude sample $M_a(i)$, said first converting means comprises a first receiver means for producing vector data from said high beam return signal and a first processor means coupled to said first receiver means for determining said amplitude sample $M_a(i)$;
    second means coupled to said transmitting means for converting a return signal of said target from said low beam pattern to an amplitude sample $M_b(i)$, said second converting means comprises a second receiver means for producing vector data from said low beam return signal and a second processor means coupled to said second receiver means for determining said amplitude sample $M_b(i)$; and means coupled to said amplitude sample outputs $M_a(i)$ and $M_b(i)$ of said first converting means and said second converting means for processing said outputs to determine said height of said target.

2. The radar system as recited in claim 1 wherein:
said transmitting means transmits said radar signal via said low beam pattern portion of said transmitting means.

3. The radar system as recited in claim 1 wherein said height processing means comprises:
means for calculating a normalized difference $C(i)$ between said amplitude sample $M_a(i)$ and said amplitude sample $M_b(i)$;
means coupled to said calculating means for storing antenna pattern conversion data; and
means coupled to said storing means for calculating the height of said target.

4. The radar system as recited in claim 3 wherein:
said antenna pattern conversion data provides compensation to said calculated normalized difference $C(i)$ for nonlinearity of said antenna pattern.

5. The radar system as recited in claim 1 wherein:
said system comprises a switch means coupled to said amplitude sample outputs $M_a(i)$ and $M_b(i)$ for selecting said high beam or said low beam to determine said azimuth and range of said target.

6. A two and one-half dimensional radar system for determining the height of a target over a predetermined range of elevation angles comprising:
means for transmitting a radar signal including a dual beam antenna having a high beam pattern and a low beam pattern;
first means coupled to said transmitting means for converting a return signal of said target from said high beam pattern to an amplitude sample $M_a(i)$;
second means coupled to said transmitting means for converting a return signal of said target from said low beam pattern to an amplitude sample $M_b(i)$;
means coupled to said first and second converting means for calculating a normalized difference $C(i)$ between said amplitude sample $M_a(i)$ and said amplitude sample $M_b(i)$;
means coupled to said calculating means for storing antenna pattern conversion data to compensate said normalized difference $C(i)$ for nonlinearity of said antenna pattern; and
means coupled to said storing means for calculating the height of said target in accordance with elevation angle data from said storing means.

7. The radar system as recited in claim 6 wherein:
said transmitting means transmits said radar signal via said low beam pattern portion of said transmitting means.

8. The radar system as recited in claim 6 wherein said first converting means comprises:
a first receiver means for producing vector data from said high beam return signal; and
first processor means coupled to said first receiver means for determining said amplitude sample $M_a(i)$.

9. The radar system as recited in claim 6 wherein said second converting means comprises:
a second receiver means for producing vector data from said low beam return signal; and
second processor means coupled to said second receiver means for determining said amplitude sample $M_b(i)$.

10. A method for determining with a radar system azimuth, range and height of a target over a predetermined range of elevation angles comprising the steps of:
transmitting a radar signal with a dual beam antenna having a high beam pattern and low beam pattern;
converting a return signal of said target from said high beam pattern to an amplitude sample $M_a(i)$ by (a) producing vector data in a first receiver means from said high beam return signal, and (b) determining in a first processor means coupled to said first receiver means said amplitude sample $M_a(i)$;
converting a return signal of said target from said low beam pattern to an amplitude sample $M_b(i)$ by (a) producing vector data in a second receiver means from said low beam return signal, and (b) determining in a second processor means coupled to said second receiver means said amplitude sample $M_b(i)$; and
processing said amplitude sample outputs $M_a(i)$ and $M_b(i)$ of said first converting means and said second converting means to determine said height of said target.

11. The method as recited in claim 10 wherein said steps of processing said amplitude sample outputs $M_a(i)$ and $M_b(i)$ further comprises the steps of:
calculating a normalized difference between said amplitude sample $M_a(i)$ and said amplitude sample $M_b(i)$;
storing antenna pattern conversion data in memory means addressed by said normalized difference to compensate for nonlinearity of said antenna pattern; and
calculating the height of said target by means coupled to an output of said storing means.

12. The method as recited in claim 10 further comprises the step of selecting said high beam or said low beam amplitude sample outputs $M_a(i)$ and $M_b(i)$ to determine said azimuth and range of said target.

13. A method for determining with a radar system the height of a target over a predetermined range of elevation angles comprising the steps of:
transmitting a radar signal with a dual beam antenna having a high beam pattern and a low beam pattern;
converting a return signal of said target from said high beam pattern to an amplitude sample $M_a(i)$ by first means coupled to said transmitting means;
converting a return signal of said target from said low beam pattern to an amplitude sample $M_b(i)$ by second means coupled to said transmitting means;
calculating a normalized difference between said amplitude sample $M_a(i)$ and said amplitude sample $M_b(i)$;
storing antenna pattern conversion data in memory means addressed by said normalized difference to compensate for nonlinearity of said antenna pattern; and
calculating the height of said target by means coupled to an output of said storing means.

* * * * *